United States Patent [19]

German

[11] Patent Number: 5,513,934
[45] Date of Patent: May 7, 1996

[54] FASTENER FOR TRUCK BED LINER

[76] Inventor: Mark K. German, 73 Gilmore St., Uniontown, Pa. 15401

[21] Appl. No.: 293,287

[22] Filed: Aug. 22, 1994

[51] Int. Cl.$^6$ ............................ F16B 19/00; F16B 21/00; B62D 33/00
[52] U.S. Cl. ...................... 411/344; 411/508; 411/913; 24/297; 296/39.2
[58] Field of Search ................................. 411/340, 342, 411/344, 345, 508, 913; 24/289, 295, 297; 296/39.2

[56] References Cited

U.S. PATENT DOCUMENTS

| | | | |
|---|---|---|---|
| 1,135,612 | 4/1915 | Platt . | |
| 1,648,927 | 11/1927 | Wurdack . | |
| 2,853,913 | 9/1958 | Rapata . | |
| 3,029,486 | 4/1962 | Raymond | 24/73 |
| 3,093,027 | 6/1963 | Rapata . | |
| 3,093,874 | 6/1963 | Rapata | 24/73 |
| 4,122,583 | 10/1978 | Gicittner et al. | 24/208 |
| 4,181,349 | 1/1980 | Nix et al. | 296/39 |
| 4,305,182 | 12/1981 | Peterson | 24/289 |
| 4,470,737 | 9/1984 | Wollar | 411/508 |
| 4,493,580 | 1/1985 | Ruehl | 411/508 X |
| 4,572,568 | 2/1986 | Kapp et al. | 296/39 |
| 4,595,229 | 6/1986 | Wagner | 296/39 |
| 4,659,133 | 4/1987 | Gower | 296/39 |
| 4,677,714 | 7/1987 | Wright | 24/590 |
| 4,708,895 | 11/1987 | Mizusawa | 428/31 |
| 4,740,026 | 4/1988 | Wagner | 296/39 |
| 4,765,036 | 8/1988 | Iguchi et al. | 24/289 |
| 4,768,822 | 9/1988 | Gower | 296/39 R |
| 4,796,942 | 1/1989 | Robinson et al. | 296/39.2 |
| 4,850,633 | 7/1989 | Emery | 296/39.2 |
| 4,906,040 | 3/1990 | Edwards | 296/39.2 |
| 4,924,561 | 5/1990 | Yoneyama | 411/508 X |
| 5,046,775 | 9/1991 | Marcum, Jr. et al. | 296/39.2 |
| 5,150,940 | 9/1992 | Kennedy | 296/39.2 |
| 5,345,658 | 9/1994 | Kennedy | 24/297 |

OTHER PUBLICATIONS

"Futurex The Next Generation In Truckliners." by Futurex Automotive, div. of Futurex Industries, Inc.
"Sanyo Service Manual" T.V. Model AVM 260, 1985, pp. 1, 82, 83, 85, 86 Sanyo Electric, Inc., Compton, CA.

*Primary Examiner*—Neill R. Wilson
*Attorney, Agent, or Firm*—Price & Adams

[57] ABSTRACT

A protective liner is secured to a truck cargo bed by a plurality of one-piece resilient fasteners each including a bearing plate and a clamp member. The bearing plate and clamp member are integrally formed with the clamp member extending perpendicularly from the bearing plate. A lever arm extends from a peripheral edge of the clamp member toward the bearing plate to a free end portion removed from contact with the base plate. The lever arm is normally spring biased downwardly away from the bearing plate. On installation the clamp member is projected through an opening in the liner with the peripheral edge sliding over the edge of the liner around the opening. As the clamp member advances through the opening, the lever arm slides on the liner edge and is urged upwardly toward the bearing plate to allow the clamp member to pass through the opening. The pivotal movement of the lever arm allows the bearing plate to be compressed against the liner without flexing the bearing plate relative to the clamp member. The lever arm springs downwardly into latching engagement with the edge of the liner around the opening to urge a pressure point at the upper peripheral edge of the clamp member against a rail flange of the cargo bed and apply a downward force upon the liner so that a cap of the liner is compressed on the top surface of the rail. The liner is compressed against the rail flange by opposing forces exerted by the bearing plate and the clamping member.

20 Claims, 2 Drawing Sheets

FASTENER FOR TRUCK BED LINER

BACKGROUND OF THE INVENTION

1. Field of the Invention

This invention relates to method and apparatus for securing a protective bed liner to a cargo bed of a truck and more particularly to a one-piece molded fastener for securing the walls of the bed liner to a downwardly extending flange of a rail on a cargo bed side wall.

2. Description of the Prior Art

Fasteners for securing panels of sheet material to a supporting structure are well known in the art and particularly for connecting parts to the frame of an automotive vehicle. U.S. Pat. Nos. 2,853,913; 3,029,486; 3,093,027; 4,122,583; and 4,470,737 are representative of panel clips and fasteners that are used to connect automotive trim to the vehicle body and the fire wall to the vehicle body. The clips and fasteners disclosed in the above patents include an expandable portion that is forced through a restricted opening in the panel and the supporting wall to secure the panel to the supporting wall. Typically, the clips are one-piece, molded plastic bodies.

U.S. Pat. Nos. 3,093,874; 4,708,895; and 4,765,036 disclose one-piece automotive trim fasteners that include a resilient locking portion that is compressible to permit the fasteners to be engaged so that when the fastener is installed the locking portion is released to frictionally engage the wall of the supporting structure.

With the plastic clips and fasteners disclosed in the above-identified patents, it is necessary to pass the clip through aligned holes in the sheet member or panel and the wall of the supporting structure. If the wall of the supporting structure does not include a hole, then one must be drilled, for example, into the vehicle body to receive the clip. This is particularly undesirable when a hole must be drilled in the metal body of the vehicle. If clips and fasteners of this type are used to secure a protective bed liner to a truck cargo bed, holes must be drilled in the side walls or flange portions of the truck bed. This can lead to rusting and deterioration of the side wall around the holes.

To avoid drilling holes in metal supporting walls for receiving clips and fasteners to secure sheet member panels in place, non-invasive fasteners have been proposed. One type of non-invasive fastener utilizes a toggle bolt as disclosed in U.S. Pat. Nos. 1,135,612 and 1,648,927. Toggle bolt-clamps, however, are limited in use because they have dimensional and structural features that restrict their usage.

One of the problems encountered in securing a protective liner to the cargo bed of a pickup truck is providing a fastener that can connect a bed liner to a number of different designs of truck bed side walls and flanges. The flanges themselves vary considerably in dimension and configuration. For example, a truck bed rail flange may be vertical or angular and of varying length with or without an extending lip. Therefore, a bed liner fastener must be adaptable to a wide range of cargo bed designs to avoid customizing fasteners for each cargo bed design. Without the provision of a versatile fastener, the availability of fasteners for the different designs of cargo beds becomes unmanageable.

To meet the growing demand for installing protective liners on all types of truck cargo beds, a number of fasteners have been proposed that are adaptable to a wide range of cargo bed styles. These types of fasteners are also preferred because they do not require that holes be drilled in the truck bed side walls.

U.S. Pat. Nos. 4,181,349; 4,572,568; 4,595,229; 4,659,133; 4,740,026; 4,768,822; 4,796,942; and 4,850,633 are examples of non-invasive fasteners for truck bed liners that can be used with a number of different styles of truck cargo beds. However, these fasteners require multiple parts, such as wing nuts, bolts and screws, that secure the fastener to the liner and clamp the liner to the bed side wall flange. Substantial inventory and order problems are encountered with any type of fastener that includes multiple pieces. The pieces must be properly packaged to see that all components are provided, and the installer must exercise care to see that all the pieces are available for installation.

To overcome the problems encountered with multi-piece non-invasive fasteners for truck bed liners, one-piece fasteners have been proposed. An example one-piece fastener, not necessarily for bed liners, fabricated of resilient material is disclosed in U.S. Pat. No. 4,677,714. U.S. Pat. No. 4,924,561 discloses a one-piece fastener that includes a lever for securing the fastener in a hole of a panel for mounting electric wire to the panel.

One-piece fasteners for bed liners are disclosed in U.S. Pat. Nos. 4,906,040; 5,046,775; and 5,150,940. With the fastener disclosed in U.S. Pat. No. 4,906,040 a pair of vertically spaced slots must be cut in the bed liner with a ridge formed in the liner wall between the slots to receive and retain a resilient clip. The clip has end portions which extend through the slots and a central body portion that frictionally engages the ridge. An upper end of the clip extends through one slot into underlying wedging engagement with the flange of the truck side wall. A lower end of the clip engages the opposite surface of the liner wall. While this device secures the liner to the truck bed wall with a single resilient piece, the liner wall must be specially constructed to receive and retain the resilient clip in place.

U.S. Pat. Nos. 5,046,775 and 5,150,940 utilize one-piece resilient clips or fasteners which do not require that the bed liner be specially constructed to receive the fastener, other than forming an opening or aperture in the liner wall. Each of these fasteners includes a unitary molded piece requiring no tools for installation and features a snap-engagement with the flange of the truck bed rail to hold the liner securely in place. No holes are required to be drilled in the truck bed side nor screws or other multi-piece fasteners used.

The known one-piece bed liner fasteners include an arcuately shaped clamping member rigidly connected to a base plate. The clamp member is extended through the hole in the bed liner and is snapped into locking engagement with the rail flange. The clamping member is urged against the rail flange, and the base plate is compressed against the liner side wall to secure the bed liner to the cargo bed. With this arrangement, the liner side wall is securely and tightly held against the rail flange by opposing forces exerted by the clamp member and base plate.

With the one-piece fasteners, as disclosed in U.S. Pat. Nos. 5,046,775 and 5,150,940, the arcuately shaped clamp member is rigidly connected to the base plate. This requires bending the base plate relative to the clamp member to permit the fastener to snap in place and compress the liner on the rail flange. This has the effect of placing significant bending stresses on the point of connection of the base plate to the clamp member. Consequently, the base plate is subject to cracking or breaking, rendering the fastener inoperative.

U.S. Pat. No. 4,305,182 discloses a C-shaped spring retainer clip for a refrigerator door gasket that overcomes the adverse effects of bending rigid C-shaped fasteners. A C-shaped bed liner fastener that does not require pivoting or bending of the base plate relative to the clamp member is manufactured and sold by Futurex Automotive Division of Futurex Industries, Inc., Marshall, Indiana. While this fastener does not rely upon the snap-in action of the one-piece fasteners described above, it requires that the base plate be held in position on the liner by a screw to maintain the end of the C-shaped clamp member compressed against the flange of the truck bed rail.

While it has been suggested by the prior art devices to provide a resilient one-piece fastener for tightly securing the wall of a bed liner to the flanged rail of a truck cargo bed, the prior art devices require bending or flexing of the rigidly connected parts. This places stress on the fastener tending to break the fastener. In the alternative, those fasteners which require multi-piece components to clamp the bed liner to the truck bed rail are not convenient to install.

Therefore, there is need for a resilient one-piece bed liner fastener that is non-invasive and requires no tools for installation. The fastener must be easily snapped in place without requiring excessive flexing or bending of the clamp member relative to the base plate.

SUMMARY OF INVENTION

In accordance with the present invention, there is provided a fastener for securing a sheet member to a flange portion of a supporting wall that includes a base member for engaging a surface around an opening in a sheet member to be secured to a flange portion of a supporting wall. An arcuately shaped clamping member extends at one end from the base member to a free end portion at an opposite end. The clamping member has a length for passing through the opening in the sheet member and positioning the free end portion in contact with the flange portion of the supporting wall. The clamping member has a planar body portion defined by a peripheral edge joined at one end to the base member and extending in an arcuate path to a second end spaced closely adjacent to the base member. The clamping member includes a lever portion pivotally connected at one end portion to the peripheral edge and extending therefrom to a free end portion forming the peripheral edge second end spaced from the base member. The lever portion is normally biased in a direction away from the clamping member body portion. The lever portion is pivotal on the peripheral edge toward the clamping member body portion against the direction of bias of the lever portion. The lever portion is pivoted toward the clamping member body portion into overlying relation with the sheet member surrounding the opening to exert a downward biasing force upon the sheet member and urge the clamping member peripheral edge against the flange to secure the sheet member to the supporting wall.

Further in accordance with the present invention, there is provided a method for securing a protective liner to a side wall of a bed of a pickup truck that includes the steps of positioning a panel of a protective liner in abutting relation with the side wall of a pickup truck. A clamp member attached to a base member is aligned oppositely an opening in the panel. The clamp member is extended through the opening with the base plate overlying the panel around the opening to restrain the base plate from passing through the opening. The peripheral edge of the clamp member is moved into position opposite a downwardly extending flange portion of the side wall of the truck. A lever arm is pivotally connected at one end to the peripheral edge of the clamp member to extend at an opposite end toward the base plate.

The lever arm is normally spring biased downwardly away from the base plate. The lever arm is pivoted upwardly relative to the base plate against the spring bias into overlying relation with an edge of the panel surrounding the opening. The lever arm is released to spring downwardly and exert a downward force upon the panel to urge the clamp member peripheral edge into engagement with the flange portion to secure the panel to the bed side wall.

The present invention is also directed to apparatus for securing a protective liner to a side wall of a bed of pickup truck that includes a resilient unitary molded body portion including a bearing plate and a fastener clamp. The fastener clamp extends outwardly from the bearing plate. The fastener clamp has a peripheral edge with a pressure point at an upper end portion projecting toward the bearing plate and a spring biased arm member at a lower end portion extending toward the bearing plate. The arm member is normally spring biased in a direction away from the bearing plate so that when pivoted upwardly by a force acting against the direction of spring bias urges the pressure point to apply a compressive force toward the bearing plate.

Accordingly, a principal object of the present invention is to provide method and apparatus for securing a protective liner to a cargo bed of a pickup truck by a one-piece resilient fastener that manually locks in place without the need for tools or holes to be drilled in the cargo bed.

Another object of the present invention is to provide a one-piece resilient fastener for securely clamping a protective liner to a flanged rail of a cargo bed of a pickup truck by locking the fastener in place without the risk of breaking the fastener.

An additional object of the present invention is to provide a one-piece resilient C-shaped fastener for securing a sheet member to a flange portion of a supporting wall without the need for tools, multi-piece fasteners, or drilling holes in the flange.

An additional object of the present invention is to provide a fastener for securely clamping a protective bed liner to side walls of a cargo bed of a truck by exerting a spring force upon the bed liner to clamp it to the cargo bed.

These and other objects of the present invention will be more completely disclosed and described in the following specification, accompanying drawings and appended claims.

DESCRIPTION OF THE PREFERRED EMBODIMENTS

Figure 1:
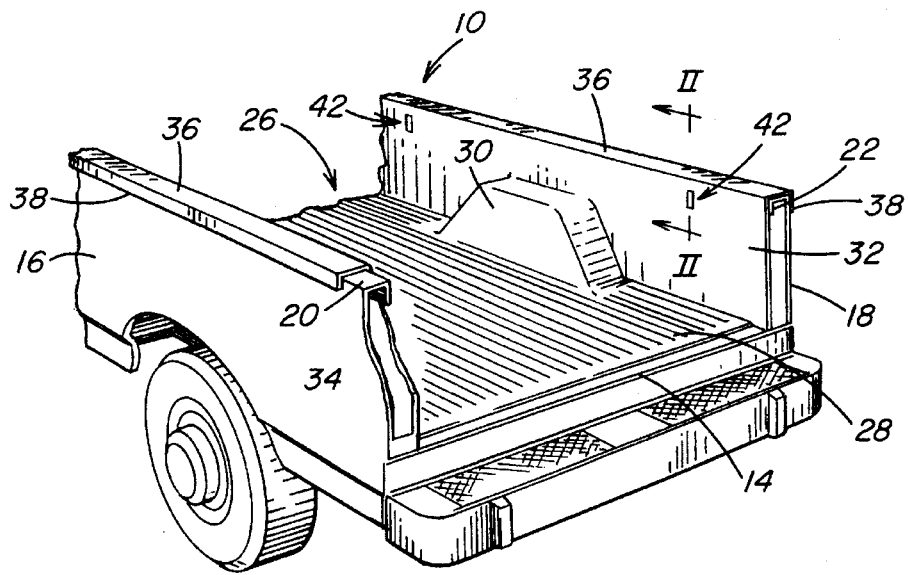
FIG. 1 is a fragmentary isometric view of a portion of a pickup truck cargo bed, illustrating a protective liner secured to the cargo bed by fasteners in accordance with the present invention.

Referring to the drawings and particularly to FIG. 1, there is illustrated a conventional pickup truck 10 having an operator's cab (not shown) and a cargo bed 12. The cargo bed 12 includes a floor or bottom wall 14 and oppositely positioned side walls 16 and 18 extending vertically from the bottom wall 14 in spaced parallel relationship. In a conventional structure, each side wall 16 and 18 includes a top rail 20 extending longitudinally the length of the bed. The rail 20 includes a downwardly extending flange 22, as seen in detail in FIG. 2. The flange 22 terminates in a lip 24 extending outwardly in the direction toward the side wall 16, 18.

Figures 2, 3:
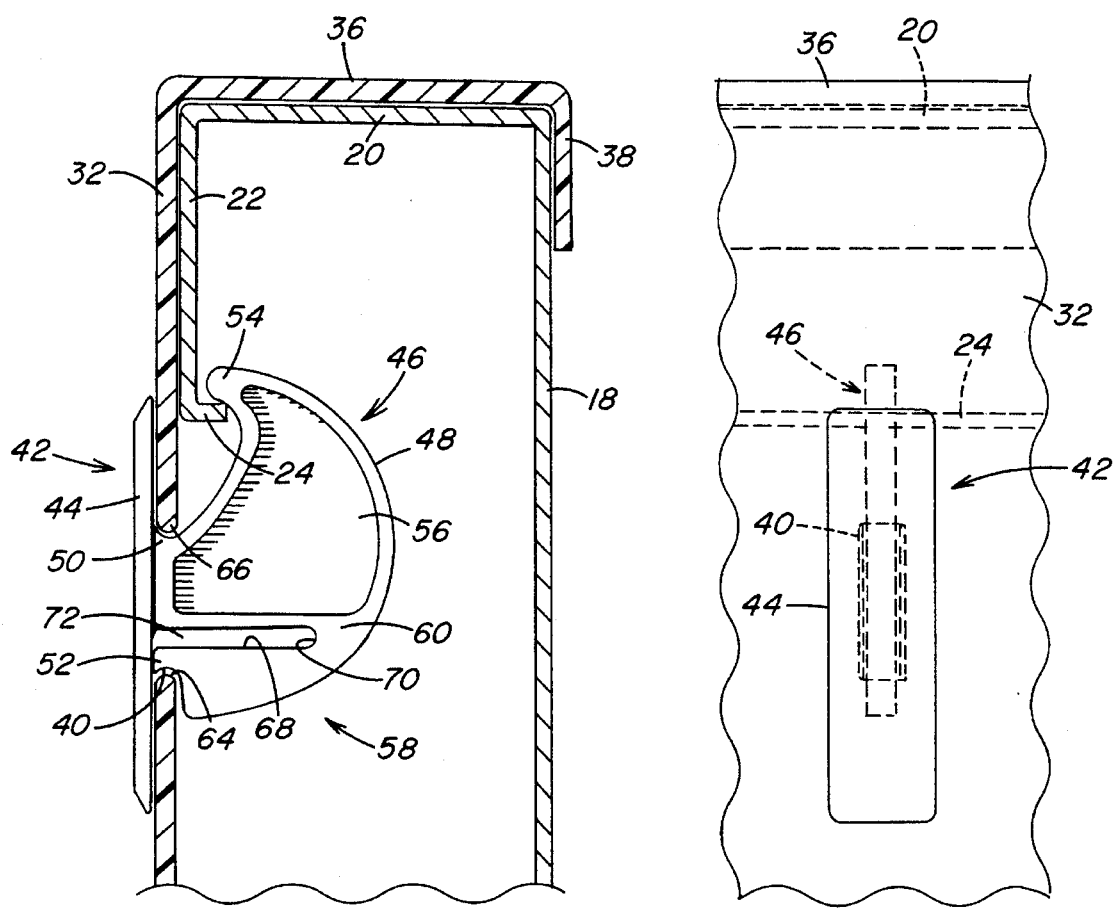
FIG. 2 is a fragmentary sectional view taken along line II—II of FIG. 1, illustrating a one-piece resilient fastener for securing the protective liner to a flanged rail of the cargo bed in accordance with the present invention.
FIG. 3 is a fragmentary view in side elevation of the protective liner, illustrating a base plate of the fastener compressed against the liner in overlying relation with the hole through which a portion of the fastener extends.

As well known in the art, the structure of the side walls 16 and 18 and top rail 20 varies considerably between different makes and models of trucks as to dimensions and configuration. With some models the flange does not terminate in a horizontally extending lip as shown in FIG. 2. The flange is a vertical member with no lip or in-turned leg. It should also be understood that the cargo bed 12 is closed at one end portion by a tailgate which is not shown in FIG. 1 to better illustrate the configuration of the cargo bed 12.

To protect the cargo bed 12 from damage, a protective bed liner generally designated by the numeral 26 is positioned in the cargo bed 12 to cover the front wall (not shown), bottom wall 14, and side walls 16 and 18. The bed liner 26 is formed of high density polyethylene in a single, integral unit.

The liner 26 includes a bottom wall 28 adapted to fit on and substantially cover the full length and width of the cargo bed bottom wall 14. The liner bottom wall 28 normally has a width substantially as great as the distance between the truck bed rails 20. In a conventional manner, the liner bottom wall 28 includes a plurality of separate inverted U-shaped longitudinal corrugations. A pair of wheel wells 30 extend upwardly from the bottom wall and are adapted to accommodate the truck cargo bed rear wheel wells.

Two liner side walls 32 and 34 and a front wall (not shown) are integrally formed with the liner bottom wall 28 and wheel wells 30. With this arrangement, the bed liner 26 is complementary with the cargo bed 12 at the front wall, side walls 16 and 18 and bottom wall 14 to completely cover and protect the surfaces of the cargo bed 12.

As seen in FIG. 2, each liner side wall 32 and 34 includes a top cap 36 that is formed integral with and extends horizontally relative to the vertical side wall. The top cap 36 extends the width of the truck bed top rail 20 and includes a downwardly extending flange 38 that terminates a relatively short distance from the top cap 36. With this arrangement, the distance between the bed liner side walls 32, 34 and the flange 38 is equal to the width of the truck bed top rail 20.

As seen in FIGS. 1 and 2, the bed liner side walls 32 and 34 are provided with openings 40 spaced a preselected distance apart and located a relatively short distance from the liner top cap 36. As seen in FIG. 1, at least two openings are provided in each liner side wall on the opposite sides of the wheel well 30; however, any number of openings may be provided. The size and configuration of the opening 40 is adapted to receive a fastener generally designated by the numeral 42 that securely and tightly clamps the liner side walls 32 and 34 to the truck cargo bed side walls 16 and 18 without the requirement for drilling holes in the cargo side walls or the use of bolts or screws. The fasteners 42 manually snap in place without the need for tools.

As illustrated in FIG. 3, each fastener 42 has a length greater than its width so that a portion of the fastener remains in abutting relation with the side of the liner positioned within the cargo bed 12. Other than this limitation, the openings 40 do not require any specific configuration. Each fastener 42 is a single piece of plastic or similar resilient material, such as polyethylene, used to fabricate the bed liner 26.

Each fastener 42, as illustrated in detail in FIGS. 4–8, includes a base member or bearing plate 44 integrally formed with an arcuately shaped clamping member generally designated by the numeral 46. As seen in FIG. 3, the bearing plate 44 has a generally rectangular configuration. The clamping member 46 extends from a center region of the bearing plate 44 perpendicularly therefrom.

Figure 7:
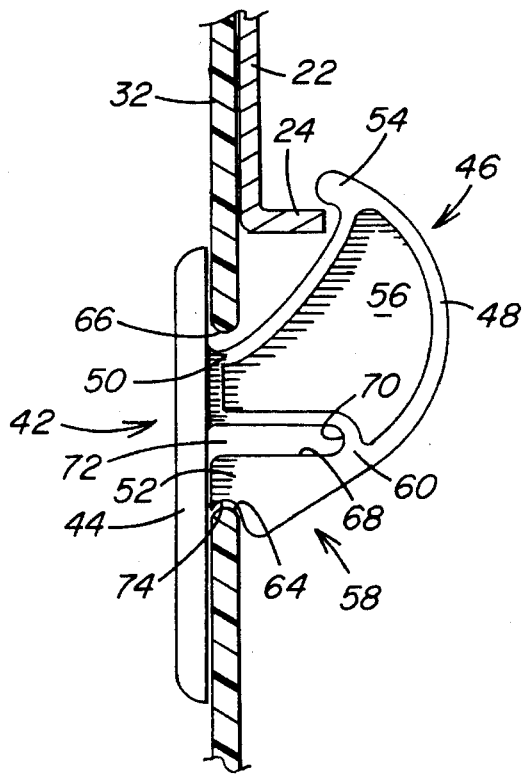
FIG. 7 is a fragmentary sectional view in side elevation of the installed fastener, illustrating the bed liner clamped to the flange rail of the truck cargo bed.

The length and width of the bearing plate 44 exceeds the length and width of the opening 40 in the liner side wall so that the surface area of the bearing plate exceeds the area of the opening 40. This prevents, as shown in FIGS. 2 and 7, the bearing plate 44 when positioned in a coplanar relationship with the liner side wall from passing through the opening 40.

Figure 4:
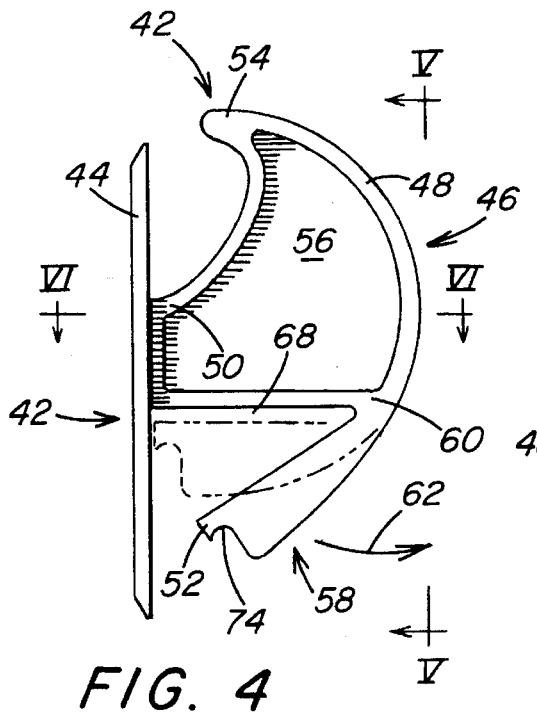
FIG. 4 is a view in side elevation of the one-piece resilient fastener in accordance with the present invention, illustrating a lever arm of the fastener in a normally downward biased position and pivotal to an upward position as indicated in phantom.

The clamping member 46 has an arcuately shaped peripheral edge 48 that extends from one end portion 50 to an opposite free end portion 52 where the end portions 50 and 52 are positioned in spaced overlying relationship. In accordance with the present invention, the clamping member end portion 50 is formed integral with the base plate 44 and the end portion 52 is disconnected from the bearing plate 44 to move in a pivotal fashion relative to the bearing plate 44 as shown in FIG. 4.

Figure 8:
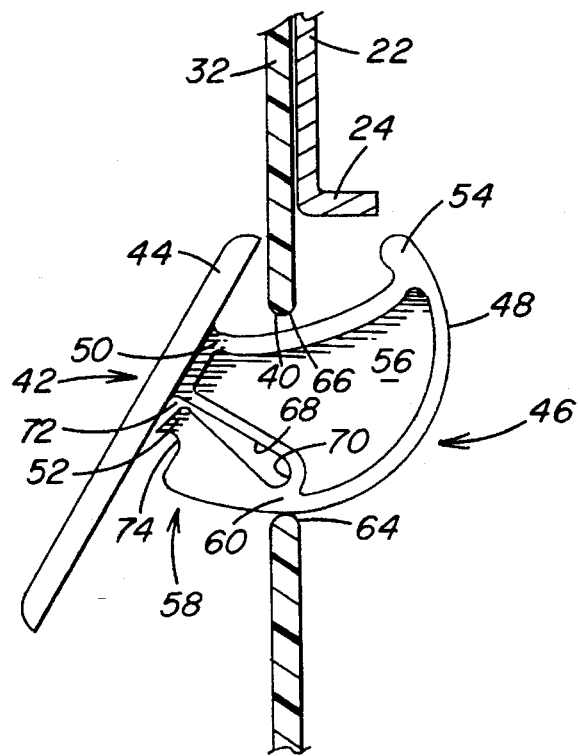
FIG. 8 is a view similar to FIG. 7, illustrating the initial insertion of the fastener through the opening in the bed liner with the lever arm pivoted upwardly to lock in place on the liner.

Preferably, the peripheral edge 48 of the clamping member 46 is arcuately shaped to facilitate the insertion of the clamping member 46 through the bed liner opening 40 as shown in FIG. 8. Extending upwardly from the end portion 50 of the clamping member 46 is a pressure point 54 for engaging the flange lip 24 or the flange directly in the embodiment where the cargo bed rail 20 does not include a lip 24 on the flange.

Figures 5, 6:
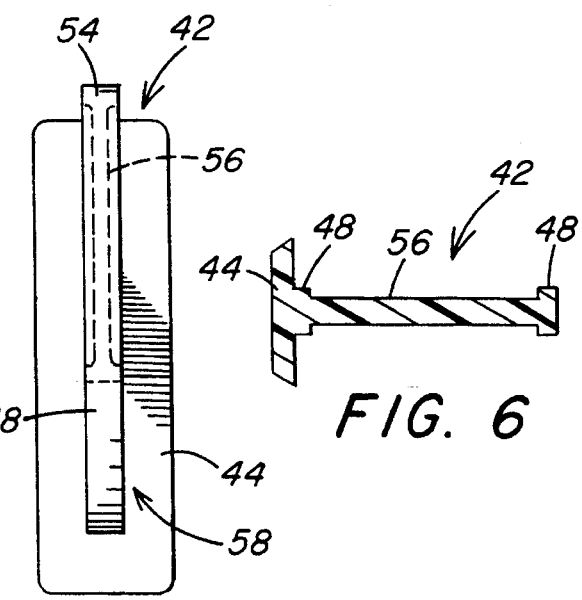
FIG. 5 is an end view of the fastener taken along line V—V of FIG. 4.
FIG. 6 is a sectional view of the fastener taken along line VI—VI of FIG. 4.

The clamping member 46 has a generally planar configuration defined by the arcuate peripheral edge 48 and a central body portion 56. As seen in FIG. 6, the central body portion 56 has a thickness less than the thickness of the peripheral edge 48. This permits the body portion 56 to attenuate upon installation and allow for dimensional variances in the various styles of truck cargo beds.

Extending from the lower portion of the peripheral edge 48 is a lever arm generally designated by the numeral 58. The lever arm 58 includes a first end portion or hinge point 60 and a second end portion 52 which forms the free end portion of the peripheral edge 48, as above described. The lever arm 58 is integrally formed as an extension of the peripheral edge 48. The lever arm 58 is pivotal about the hinge point 60 between a first or lowermost position, as illustrated by the solid lines in FIG. 4, to a second or uppermost position, as illustrated in phantom in FIG. 4. Due to the resilient nature of the material from which the fastener 42 is fabricated, the lever arm 58 is normally biased to assume the lowermost position as shown in FIG. 4.

In its normally biased position, the lever arm 58 is urged downwardly from the clamping member central body portion 56 and away from the bearing plate 44 in the direction indicated by the directional arrow 62 in FIG. 4. Thus, the lever arm 58 is normally acting in the direction 62 away from the base plate 44.

To pivot the lever arm 58 upwardly about the hinge point 60 an upward force must be applied to the lever arm in a direction opposite to the arrow 62. In this manner, the lever arm 58 is pivoted to the position shown in phantom in FIG. 4. The downward spring force normally exerted by the lever arm 58 resists upward movement of the lever arm. Upon release of an upward force applied to the lever arm 58, the arm 58 pivots or springs downwardly about the hinge point 60 to the lowermost position as shown by the solid lines in FIG. 4.

In the static position of the fastener 42, as shown in FIG. 4, the lever arm 58 is positioned in its lowermost position where the free end portion 52 of the arm is substantially displaced from the central body portion 56 and the bearing plate 44. Upon insertion of the fastener 42 into the opening 40 in the bed liner side wall 32, the clamping member 46 is positioned oppositely of the opening 40. The upper end portion or pressure point 54 is first introduced through the opening 40. The lower peripheral edge 48 slides on a lower surface 64 of the liner as the upper surface of the peripheral edge 48 passes beneath an upper surface 66 of the liner surrounding the opening 40. By sliding the peripheral edge 48 on the liner surface 64, the fastener 42 is guided by the arcuate configuration of the clamping member peripheral edge 48 through the liner opening 40.

The lever arm 58 is spaced from the clamping member body portion 56 by an elongated slot 68. The slot 68 is closed at end portion 70 and is open at end portion 72 where the lever arm 58 is spaced from and disconnected from the bearing plate 44. The length and width of the slot 68 is designed to provide the lever arm 58 with a wide range of pivotal movement about the hinge point 60. This permits the lever arm 58, as shown in FIG. 8, to be pivoted upwardly about hinge point 60 as the peripheral edge 48 slides over the side wall surface 64 as the clamping member 46 is advanced through the opening 40.

The resilient nature of the lever arm 58 and the dimensions of the slot 68 facilitate pivotal movement of the lever arm toward the bearing plate 44. This allows the lever arm 58 to follow the peripheral edge 48 through the opening 40. Upward pivotal movement of the lever arm 58 about the hinge point 60 is accomplished by sliding the peripheral edge 48 on the liner side wall surface 64.

To stabilize the fastener 42 in its clamped position on the liner side wall 32 as shown in FIG. 7, the lever arm 58 includes a recess 74 at the lower edge of the arm free end portion 52. Also, the peripheral edge 48 at end portion 50 is recessed to receive the liner surface 66. Preferably, the recess 74 has an arcuate configuration complementary with the configuration and thickness of the bed liner lower surface 64. As the lever arm 58 slides along the surface 64, it pivots upwardly until the clamping member 46 has advanced through the opening 40 to the point where the recess 74 snaps into position on the liner lower surface 64.

In the position shown in FIG. 7, the natural spring bias of the lever arm 58 locks the arm on the liner surface 64, and the bearing plate 44 is compressed in abutting position with the surface of the bed liner side wall. Further, the spring bias of the lever arm 58 exerts a downward compressive force upon the liner side wall to force the bearing plate 44 against the surface of the side wall. This urges the pressure point 54 at the upper end of the peripheral edge 48 into clamping engagement with the flange lip 24.

The downward force exerted by the lever arm 58 urges the upper end of the clamping member 46 against the lip 24. Accordingly, movement of the clamping member 46 toward the flange 22 is restrained by abutting contact of the pressure point 54 with the lip 24 or, in the case where the top rail 20 does not have a lip 24, into abutting relation with the vertical wall of the flange 22. With this arrangement, the bed liner side wall 32 and rail flange 22 are compressed together by opposing forces exerted by the bearing plate 44 against the bed liner side wall and the clamping member 46 against the rail flange 22.

The bed liner side wall and rail flange are compressed together by the fastener 42 of the present invention. In addition, the lever arm 58 exerts a downward force upon the bed liner around the opening 40 to compress the bed liner top cap 36 into frictional engagement with the truck bed top rail 20, as shown in FIG. 2.

The provision of the recess 74 on the bottom edge of the lever arm 58 to receive the surface 64 of the bed liner around the opening 40 serves to stabilize the fastener 42 in engagement with the bed liner 26. However, the recess 74 is not essential to the operation of the fastener 42. The lever arm 58 is equally operable where the edge of the lever arm 58 without the recess 74 engages the bed liner to exert a downward force on the bed liner.

Further in accordance with the present invention, the provision of the lever arm 58 pivotal on the peripheral edge 48 toward and away from the clamping member body portion 56 permits installation of the fastener 42 without requiring flexing of the bearing plate 44 relative to the clamping member body portion 56. As shown in FIG. 8, the pivotal nature of the lever arm 58 permits the clamping member 46 to be compressed to the degree to permit the body portion 56 to be advanced through the opening 40 without flexing of the bearing plate 44.

Absent the provision of the pivotal lever arm 58, the bearing plate 44 would have to flex or bend outwardly from the bed liner sidewall to permit the body portion 56 to advance through the opening 40. As encountered with the prior art fasteners that require pivoting or flexing of the clamping member with respect to the bearing plate, the bending forces acting on the bearing plate are known to crack or break the bearing plate. A broken or cracked bearing plate can not be efficiently compressed against the bed liner side wall. The lever arm 58 pivotal on the clamping member peripheral edge 48 eliminates this problem.

The installation of the fastener 42 to securely clamp the bed liner to the truck cargo bed is accomplished by mere thumb pressure applied to the bearing plate 44. No tools are required for installation nor bolts or screws to hold the fastener 42 in place. When it is desired to disengage the fastener from the bed liner to remove the bed liner from the cargo bed, the fastener 42 is also easily disengaged. A thin, rigid member is advanced upwardly below the lever arm 58 between the bearing plate 44 and the bed liner side wall. The rigid member is advanced into engagement with the lever arm 58 to pivot the lever arm 58 upwardly into the slot 68.

With the lever arm 58 pivoted upwardly an outward force exerted on the pressure plate 44 permits the peripheral edge 48 to slide over the lower surface 64 of the bed liner to disengage the fastener from the flange 22. This allows the fastener 42 to be advanced out of the opening 40. Thus, the pivotal action of the lever arm 58 also facilitates efficient removal of the fastener 42 without requiring flexing of the bearing plate 44 relative to the clamping member 46. This also avoids breaking the base plate upon removal of the fastener 42 from the bed liner side wall.

According to the provisions of the patent statutes, I have explained the principle, preferred construction, and mode of operation of my invention and have illustrated and described what I now consider to represent its best embodiments. However, it should be understood that within the scope of the appended claims the invention may be practiced otherwise than as specifically illustrated and described.

I claim:

1. A fastener for securing a sheet member to a flange portion of a supporting wall comprising, a base member having a bearing surface for engaging a surface around an opening in a sheet member to be secured to a flange portion of a supporting wall, an arcuately shaped clamping member extending at one end from said base member to a free end portion at an opposite end, said clamping member having a planar body portion for passing through the opening in the sheet member, said planar body portion defined by a peripheral edge extending from a bearing surface at one end in an arcuate path to said free end portion spaced closely adjacent to said base member, said clamping member free end portion including a lever portion pivotally connected at one end portion to said peripheral edge and extending therefrom to a pivotal end portion spaced from said base member, said lever portion normally biased in a direction away from said clamping member body portion, said lever portion being pivotal on said peripheral edge toward said clamping member body portion against the direction of bias of said lever portion, and said lever portion being pivoted toward said clamping member body portion into overlying relation with the sheet member surrounding the opening to exert a downward biasing force upon the sheet member and urge said base member bearing surface toward said bearing surface of said clamping member peripheral edge to compress the sheet member against the supporting wall.

2. A fastener as set forth in claim 1 which includes, said lever portion spaced from said clamping member body portion to permit pivotal movement of said lever portion toward and away from said clamping member body portion for insertion of said clamping member through the opening in the sheet member and into locking engagement with the sheet member.

3. A fastener as set forth in claim 1 in which, said lever portion includes a lever arm connected at a hinge point to said clamping member peripheral edge and extends to a free end portion.

4. A fastener as set forth in claim 3 in which, said lever arm free end portion is removed from connection to said base member and is pivotal relative to said base member.

5. A fastener as set forth in claim 1 in which, said lever portion is integrally formed as an extension of said peripheral edge and pivotal thereon about a hinge point between a first position spring biased away from said clamping member body portion and a second position pivoted toward said clamping member body portion.

6. A fastener as set forth in claim 1 in which, said lever portion is compressed toward said clamping member body portion to permit said clamping member to pass through the opening in the sheet member without requiring flexing of said base member relative to said clamping member.

7. A fastener as set forth in claim 1 in which, said lever portion at said free end portion has a recess for engaging the sheet member surrounding the opening to stabilize said base member in a clamped position against the sheet member.

8. A fastener as set forth in claim 1 in which, said lever portion exerts a downward force upon the sheet member to compress a top cap of the sheet member into frictional engagement with a horizontal surface of the supporting wall.

9. A fastener as set forth in claim 1 in which, said base member and said clamping member apply opposing forces upon the sheet member and the flange portion to compress together the sheet member and the supporting wall.

10. A fastener as set forth in claim 1 in which, said lever portion is spaced from said clamping member body portion by an elongated slot, said slot being closed at one end portion at a hinge point where said lever portion is pivotally connected to said clamp member, said slot being open at an opposite end portion where said lever portion free end portion is spaced from said base member and said clamp member, and said slot having a selected length and width to permit pivotal movement of said lever portion about said hinge point into and out of locking engagement with the sheet member.

11. A fastener for securing a sheet member to a flange portion of a supporting wall comprising, a base member for engaging a surface around an opening in a sheet member to be secured to a flange portion of a supporting wall, an arcuately shaped clamping member extending at one end from said base member to a free end portion at an opposite end, said clamping member having a planar body portion for passing through the opening in the sheet member, said planar body portion defined by a peripheral edge extending in an arcuate path from a pressure point at one end to said free end portion spaced closely adjacent to said base member, said clamping member pressure point extending from said peripheral edge to a position oppositely of the flange portion supporting wall, said clamping member free end portion including a lever portion pivotally connected at one end portion to said peripheral edge and extending therefrom to a pivotal end portion spaced from said base member, said lever portion normally biased in a direction away from said clamping member body portion, said lever portion being pivotal on said peripheral edge toward said clamping member body portion against the direction of bias of said lever portion, said lever portion being pivoted toward said clamping member body portion into overlying relation with the sheet member surrounding the opening to lock said lever portion into position on the sheet member, and said lever portion when locked into position on the sheet member exerts a downward compressive force upon the sheet member to force said base member against the sheet member and urge said pressure point into clamping engagement with the flange portion.

12. Apparatus for securing a protective liner to a side wall of a bed of a pickup truck comprising, a resilient unitary molded body portion including a bearing plate and a fastener clamp, said fastener clamp extending outwardly from said bearing plate, said fastener clamp having a peripheral edge with a pressure point at an upper end portion projecting toward said bearing plate and a spring biased arm member at a lower end portion extending toward said bearing plate, and said arm member being normally spring biased in a direction away from said bearing plate so that when pivoted upwardly by a force acting against the direction of spring bias urges said pressure point to apply compressive force toward said bearing plate.

13. Apparatus as set forth in claim 12 which includes, means for pivotally connecting said arm member to said fastener clamp peripheral edge, said arm member extending from said peripheral edge to a free end portion spaced from said bearing plate, and said arm member being pivotal between a first position compressed against the spring bias toward said bearing plate and a second position urged by the spring bias away from the bearing plate.

14. Apparatus as set forth in claim 12 in which, said arm member is spaced from said fastener clamp peripheral edge to form an elongated slot therebetween, said slot being closed at one end at a point of pivotal connection of said arm member to said peripheral edge, said slot being open at an opposite end where said arm member is space from said bearing plate, and said arm member movable into and out of said slot as said arm member pivots about said point of pivotal connection upon application and release of the compressive force on the arm member.

15. Apparatus as set forth in claim 12 which includes, means for hingedly connecting said arm member to said fastener clamp peripheral edge for pivotal movement relative to said bearing plate.

16. A method for securing a protective liner to a side wall of a bed of a pickup truck comprising the steps of, positioning a panel of a protective liner in abutting relation with a side wall of a pickup truck, aligning a clamp member attached to a base plate opposite an opening in the panel, extending the clamp member through the opening with the base plate overlying the panel around the opening to restrain the base plate from passing through the opening, moving the peripheral edge of the clamp member into position opposite a downwardly extending flange portion of the side wall of the truck, pivotally connecting a lever arm at one end to the peripheral edge of the clamp member to extend at an opposite end toward the base plate, normally spring biasing the lever arm downwardly away from the base plate, pivoting the lever arm upwardly relative to the base plate against the spring bias into overlying relation with an edge of the panel surrounding the opening, and releasing the lever arm to spring downwardly and exert a downward force upon the panel to urge the clamp member peripheral edge into engagement with the flange portion to secure the panel to the bed side wall.

17. A method as set forth in claim 16 which includes, extending the lever arm from a pivot point on the clamp member peripheral edge to a free end portion pivotal relative to the base plate and the peripheral edge.

18. A method as set forth in claim 16 which includes, spacing the lever arm from the clamp member peripheral edge to form a slot therebetween, compressing the lever arm to pivot and move into the slot as the lever arm slides on the surface of the panel surrounding the opening in the panel to allow the clamp member to pass through the slot, and springing the lever arm downwardly in the slot into locking engagement with the panel around the opening to compress the base plate against the panel and urge the clamp member peripheral edge into abutting relation with the flange portion.

19. A method as set forth in claim 16 which includes, hingedly connecting the lever arm to the clamp member peripheral edge for pivotal movement relative to the base plate into and out of locking engagement with the panel around the opening.

20. A method as set forth in claim 16 which includes, locking the lever arm in engagement with the panel to compress the base plate against the panel, urging the clamp member peripheral edge against the flange portion, and exerting a downward force on the protective liner to frictionally engage a top cap of the liner on a top rail of the truck side wall by the spring action of the lever arm to connect the protective liner to the truck bed side wall.

* * * * *